United States Patent [19]

Dacey et al.

[11] 4,114,756
[45] Sep. 19, 1978

[54] WINDING CORE FOR HEAT SHRINKABLE FILM MATERIAL

[75] Inventors: Raymond B. Dacey, Simpsonville; Frederick David Stringer, Greenville, both of S.C.

[73] Assignee: W. R. Grace & Co., Duncan, S.C.

[21] Appl. No.: 749,945

[22] Filed: Dec. 13, 1976

[51] Int. Cl.$^2$ .................. B65D 85/67; B65H 77/02
[52] U.S. Cl. .................................. 206/389; 156/86; 242/68.5; 428/364; 428/377; 428/399; 428/906
[58] Field of Search ................. 206/389; 242/68.5; 428/906, 157, 156, 161, 357, 364, 377, 397, 399; 156/86, 85, 84, 185, 184, 189; 29/110, 122

[56] References Cited

U.S. PATENT DOCUMENTS

| | | | |
|---|---|---|---|
| 2,772,774 | 12/1956 | Rabuse | 242/68.5 |
| 3,066,794 | 12/1962 | Mulheren et al. | 242/68.5 |
| 3,297,155 | 1/1967 | Gattenby et al. | 242/68.5 |
| 3,426,892 | 2/1969 | Poncy | 242/68.5 |
| 3,433,355 | 3/1969 | Smith | 242/68.5 |
| 3,731,792 | 5/1973 | Rolston | 206/389 |
| 3,737,030 | 6/1973 | Stewart | 242/68.5 X |

OTHER PUBLICATIONS

Rienau, J. H., *Slitting and Winding Equipment*, Modern Plastics Encyclopedia 1976-1977 edition.

*Primary Examiner*—Lorraine T. Kendell
*Attorney, Agent, or Firm*—John J. Toney; William D. Lee, Jr.; John B. Hardaway

[57] ABSTRACT

A generally cylindrical core for winding a web of sheet-like material has portions with a lesser diameter than other portions such that otherwise baggy areas of the web overlie the lesser diameter area of the core. The core particularly solves the problem of elongated edges on a wound film of heat shrinkable thermoplastic material caused by differential shrinkage about a core.

10 Claims, 2 Drawing Figures

WINDING CORE FOR HEAT SHRINKABLE FILM MATERIAL

BACKGROUND OF THE INVENTION

This invention relates generally to the art of winding a web of sheetlike material and more particularly to a new winding core for use in handling such material.

In the art of producing thermoplastic film, many complex and involved measures have been taken in order to wind such film about a core to produce a roll with a substantially uniform profile. One of these techniques is disclosed in U.S. Pat. No. 2,844,846. The technique disclosed therein comprises extrusion of the thermoplatic film into a bubble prior to passing the tubular extrudate through nip rolls. The extrusion die is rotated relative to the nip rolls such that any imperfection which might be created from the die configuration will be evenly distributed about a roll resulting from the film. The even distribution of slight imperfections is an extremely important aspect of winding thermoplastic film. When such imperfections are allowed to concentrate and pile upon one another, the magnitude of a slight imperfection becomes greatly exaggerated and magnified after several thousand windings. By evenly distributing such imperfections transversely across a roll such magnification is avoided. Another technique for producing a roll of thermoplastic film material having a uniformly distributed imperfections is disclosed in U.S. Pat. No. 3,161,942. The process disclosed therein comprises rotation of the winding roll rather than rotation of the extrusion die.

Another technique for improving the profile of the rolled sheet of film is disclosed in U.S. Pat. No. 3,052,917. The process disclosed therein comprises pulling the edge portion of film from the die at a more rapid rate than the central portion. The net effect of this process is the pulling of wrinkles and distortions from the film prior to rolling.

While all of these techniques confront the problems associated with the placement and winding of a sheet of thermoplastic film about a core or mandrel, certain phenomina occur once a heat shrinkable film is wound about a core. Heretofore the prior art has not confronted the problems associated with film distortions which occur after the winding of the film onto a core for storage in handling.

SUMMARY OF THE INVENTION

It is thus an object of this invention to provide a core for winding a web of sheetlike material into a roll which minimizes distortions in the wound roll.

It is a further object of this invention to provide a core for winding thermoplastic film material which minimizes distortions which occur after winding.

It is a further object of this invention to provide a core for winding a web of heat shrinkable thermoplastic film material.

It is a still further object of this invention to provide a process for winding a web of thermoplastic film material which minimizes distortions which occur after the film has been wound on a core.

It is yet a further and more particular object of this invention to provide a process for winding a web of heat shrinkable film material which minimizes film distortion caused by film shrinkage on the wound roll.

These as well as other objects are accomplished by winding a web of material about a core which has a lesser diameter in areas where the web otherwise tends to bag or sag when unrolled.

DETAILED DESCRIPTION

According to this invention, the problems associated with web shrinkage and/or distortion during storage on winding cores or mandrels has been greatly minimized. In accordance with this invention it has been found that heat shrinkable web material will distort on a winding core during storage to produce areas which are baggy and generally non-uniform in length. Such non-uniformity greatly hampers subsequent efforts to utilize the film with high speed production equipment such as that utilized in the form, fill and seal processes.

Figure 1:
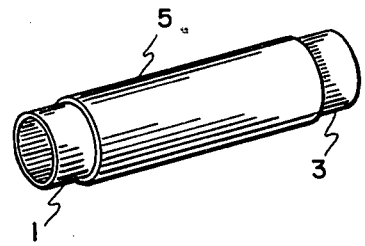
FIG. 1 is an isometric drawing of winding core in accordance with this invention.

In accordance with this invention it has been found that such non-uniformity can be overcome by utilizing a winding core which has a lesser outer diameter beneath the wound web in areas where it is desired for the resulting roll to have a lesser longitudinal expanse after storage. It has surprisingly been found that baggy or sagging areas are eliminated if the film is stored on rolls which have a reduced outer diameter in areas where such sagginess tends to occur. In the preferred form of this invention a core having terminal areas which have a lesser outer diameter than the central portion is utilized. Such a winding core is generally shown in FIG. 1 of the drawings.

This invention in actuality has a dual aspect. It is directed broadly to the winding of a web of sheetlike material. In one aspect the invention is directed to solving problems of distortion created by the shrinkage of a shrinkable film during storage. In another aspect it is directed to winding a roll which has distortions prior to winding which tend to creat objectionable areas of bagginess during the unwinding thereof. The following description is given with emphasis to the first but it is understood that the inventive concept is equally applicable to the second aspect.

As used within this disclosure the term heat shrinkable film is utilized to mean thermoplastic film which has been formed by an extrusion process. All film is heat shrinkable to some extent. The term "heat shrinkable" in its more common usage is utilized to refer to film which has been oriented by techiques well known to the art. Thermoplastic film, however, exhibits a certain amount of heat shrinkability even without purposeful orientation. The problem which this invention confronts and solves are more readily apparent on oriented film. The invention, however, is applicable to heat shrinkable film which is not oriented. This invention is thus applicable to the more common films such as polymers of the following monomers: the mono-olefins and conjugated di-olefins, e.g., ethylene, propylene, butene-1, isobutene, 1,3-butadiene, isoprene and other aliphatic mono and di-olefins; the halogen substituted olefins, e.g., vinyl chloride, vinylidene chloride,; the monovinyl aromatic compounds, e.g., styrene, alpha methylstyrene, chlorostyrene, and other aromatic olefins; and other ethylenically unsaturated monomers such as acrylonitrile, acrylamide and the like.

By this invention it has been found that the prior art practice of winding heat shrinkable film into a generally cylindrical core with a uniform outer diameter produces a resulting roll of film which is not as suitable for storage for significant periods of time as is altogether desirable. It has been found that such prior art rolls permit film to shrink transversely during storage such that the edge areas thicken, particularly at the outer convolutions of the roll, to force the edge portion of the roll to a larger diameter than prior to such shrinkage. The edge portions take a set at this larger diameter. Other areas of the film do not shrink because of the general immobility thereof caused by the mutual trapping of the individual convolutions. The net effect of this transverse shrinkage on the outer convolutions of the roll is that the edge portion of the outer convolutions thicken due to the transverse shrinkage, thus forcing the outer edge portions of the roll to a larger diameter and thus increasing the longitudinal expanse of the edge portion. The edges which are unwound from each convolution are thus longer than the central portion of the film of that convolution. Bagginess or sagging of the edges makes the film generally difficult to handle and particularly difficult for feeding to high speed packaging equipment. The problem is even further complicated by disproportionate bagginess in the two edge portions. This disproportionate bagginess results in edge portions which have length differentials.

Figure 2:
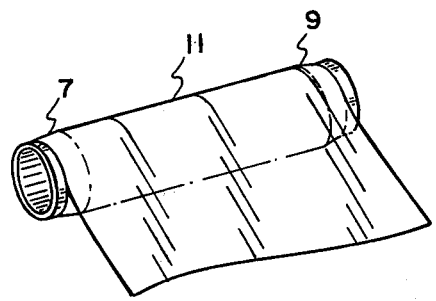
FIG. 2 is an isometric drawing of a core wound with heat shrinkable film in accordance with this invention.

According to this invention the problems associated with baggy or sagging film portions is solved by winding the thermoplastic film about a core which has a reduced outer diameter in an area where bagginess tends to exist. The bagginess of the edge portions of heat shrinkable thermoplastic film is thus eliminated by winding the film about a core such as that shown in FIG. 1 of the drawing. In such an instance the edge portions of the film are wound about the terminal portions 1 and 3 of the core 5. The resulting roll of material appears in FIG. 2 of the drawings. As is apparent therein, the edge portions of the film, 7 and 9, lie on a smaller circumference than the central portion 11 of the roll. The shrinkage of the film during storage thus results in edge portions which are generally shorter than the central portion of the film. While this does result in some non-uniformity of longitudinal expanse, the length differential does not create a problem during processing by high speed equipment since the edge portions are the portions fed to such equipment. By pulling on the shortest part of the film there is no problem associated with bagginess. It has surprisingly and additionally been found that the tendency to have differential lengths in the two edge portions is minimized by utilizing the winding core in accordance with this invention.

Another advantageous feature of the core and film wound thereon by the technique of this invention is that any longitudinal variations or distortions may be compensated for by stretching only the edge portion of the film since this is the shortest longitudinal part of the film. In the prior art longitudinal distortions could be corrected only by stretching the entire width of a sheet of film with a consequential loss of uniform characteristics. This beneficial result of the subject invention is totally surprising and unexpected.

While this invention is described with particular reference to solving the problem of edge bagginess produced during storage of heat shrinkable film, it is readily apparent that the technique employed by this invention may be utilized to solve the problem of any distortion which might be found undesirable during storage of a heat shrinkable plastic film material. In some instances it thus may be found desirable to eliminate bagginess in a central portion of a thermoplastic sheet of film material. In such an instance the outer diameter of the core is decreased in the central portion of the core. The decrease in diameter in the appropriate area is preferably of sufficient magnitude to match the thickening of that portion when a core of constant diameter is utilized. Thus if bagginess occurs from a roll having an outer radius differential of 0.1 inch, then the problem is solved in accordance with the preferred embodiment of this invention by utilizing a core with an outer radius in that area which is 0.1 inch less than the remaining radius. In general any variations in thickness are within the range of 0.1 to 10 percent of the diameter of the resulting roll.

By a similar analysis the edge portions of the roll illustrated in FIG. 1 are of sufficient size to encompass the area of the edge portion which would develop sags or bagginess during storage. It has generally been found that from about 1 to 20 percent of the film width should overlie an area of reduced diameter at each edge. About 5 percent of the film, width at each edge has been found to be an optimum for most applications. The amount of reduced diameter is best determined, as described above, by matching the decrease in diameter to the increase which would otherwise occur on a roll of constant diameter. While a gradual lessening in outer diameter is preferred, a core having a discontinuous abrupt change of outer diameter may also be utilized.

Having fully disclosed the invention, the following example is given as a further illustration and aid to the understanding thereof.

EXAMPLE

A film of oriented polypropylene 22.5 inches wide was wound on the center of a 3 inch diameter core which was 23.3 inches long to a finished diameter of 9½ inches (8,700 feet of film). The central portion of the film was 18.5 inches wide lying on a diameter which was 0.06 inches greater than the diameter of the terminal portions. The roll was aged for 7 days at 115° to 120° F. This caused the outer convolution to shrink ⅜ of an inch transversely. Upon unwinding no edge bag was observable. Normally edge bag would have developed to a degree which would have made the roll non-functional. A similar roll of oriented polypropylene wound on a conventional core would have a shrinkage of about ¾ of an inch after such storage. The extent to which the transverse shrinkage was reduced was unexpectedly surprising.

While this invention has been described with particular reference to the use of a core for solving problems associated with the shrinkage of heat shrinkable film during storage, it is readily apparent that the invention is applicable to solving problems associated with distortions in webs of sheetlike material which are present prior to winding on a roll. Thus a web which is distorted to have thicker areas along a transverse section thereof may be wound to a uniform outer diameter by winding the thicker area over a core having a reduced diameter in the area of the thickened portion. The invention is also applicable to solving problems associated with materials which tend to shrink on a roll from phenomena other than heat shrinkage. Textile materials such as wool and other natural or artificial fibers which tend to shrink with time may be wound on rolls which have sections of reduced diameter in accordance with the teachings of this invention. In any instance the amount of diameter reduction on a particular roll is preferably matched by the increase in diameter which would occur had a conventional core having a uniform outer diameter been used.

It is thus seen that a novel process for winding and storing webs of sheetlike material is provided by the process of this invention. A novel core for winding heat shrinkable material is also provided within the scope of this invention. Many other advantages and uses thereof will be apparent to those skilled in the art from a reading of the above description. Such other uses, however, are embodied within the scope of this invention as is measured by the appended claims.

What is claimed is:

1. A roll of heat shrinkable thermoplastic film, comprising:
    a generally cylindrical core having a central portion and terminal end portions, said end portions having a gradually lesser outer diameter than said central portion of said core; and
    convolutions of said film about said core, each of said convolutions comprising edge areas which would otherwise tend to shrink in an axial direction and thus elongate circumferentially after winding and during storage, said areas which tend to elongate overlying and contacting said terminal end portions of less outer diameter after storage.

2. The roll of heat shrinkable film according to claim 1 wherein said heat shrinkable film is a polymer of a mono-olefin or a conjugated di-olefin.

3. The roll of heat shrinkable film according to claim 2 wherein said heat shrinkable film is a polymer or copolymer of a monomer selected from the group consisting of ethylene, propylene, butene, isobutene, butadiene, and isoprene.

4. The roll of heat shrinkable film according to claim 1 wherein said heat shrinkable film is a polymer of a halogen substituted olefin.

5. The roll of heat shrinkable film according to claim 4 wherein said halogen substituted olefin is selected from the group consisting of vinyl chloride and vinylidene chloride.

6. The roll of heat shrinkable film according to claim 1 wherein said heat shrinkable film is comprised of an aromatic olefin.

7. The roll of heat shrinkable film according to claim 6 wherein said heat shrinkable film is a polymer or copolymer of a monomer selected from the group of styrene, alpha methyl styrene, and chlorostyrene.

8. The roll of heat shrinkable film according to claim 1 wherein said film is a polymer of ethylene.

9. The roll of heat shrinkable film according to claim 1 wherein said shrinkable film is a polymer of propylene.

10. The roll of heat shrinkable film according to claim 1 wherein said shrinkable film is a copolymer of propylene and ethylene.

* * * * *

UNITED STATES PATENT OFFICE
CERTIFICATE OF CORRECTION

Patent No. 4,114,756      Dated September 19, 1978

Inventor(s) R. B. Dacey & F. D. Stringer

It is certified that error appears in the above-identified patent and that said Letters Patent are hereby corrected as shown below:

Claim 1, line 13, delete "less" and insert -- lesser --.

Signed and Sealed this

Thirteenth Day of March 1979

[SEAL]

Attest:

RUTH C. MASON
*Attesting Officer*

DONALD W. BANNER
*Commissioner of Patents and Trademarks*